(12) United States Patent
Fisker et al.

(10) Patent No.: US 12,722,459 B2
(45) Date of Patent: Sep. 1, 2026

(54) VEHICLE HAVING RETRACTABLE REAR GATE

(71) Applicant: Fisker Inc., Manhattan Beach, CA (US)

(72) Inventors: Henrik Fisker, Manhattan Beach, CA (US); Seunghee Oh, Manhattan Beach, CA (US); Lawrence Thomas, Manhattan Beach, CA (US); Robert Dickie, Manhattan Beach, CA (US); Nima Farzin, Manhattan Beach, CA (US)

(73) Assignee: FISKER IP/AUSTRIA ASSETS TRUST, New York, NY (US)

( * ) Notice: Subject to any disclaimer, the term of this patent is extended or adjusted under 35 U.S.C. 154(b) by 403 days.

(21) Appl. No.: 18/471,428

(22) Filed: Sep. 21, 2023

(65) Prior Publication Data

US 2024/0010057 A1 Jan. 11, 2024

Related U.S. Application Data

(63) Continuation-in-part of application No. PCT/US2022/021666, filed on Mar. 24, 2022.

(60) Provisional application No. 63/450,735, filed on Mar. 8, 2023, provisional application No. 63/165,546, filed on Mar. 24, 2021.

(51) Int. Cl.

| | |
|---|---|
| ***B60J 5/10*** | (2006.01) |
| ***B60J 5/12*** | (2006.01) |
| ***B60R 5/02*** | (2006.01) |
| ***E05B 77/02*** | (2014.01) |
| ***E05B 77/54*** | (2014.01) |

(52) U.S. Cl.
CPC ................ *B60J 5/101* (2013.01); *B60J 5/12* (2013.01); *B60R 5/02* (2013.01); *E05B 77/02* (2013.01); *E05B 77/54* (2013.01); *B60Y 2304/00* (2013.01)

(58) Field of Classification Search
CPC .... B60J 5/101; B60J 5/12; B60R 5/02; B60Y 2304/00; E05B 77/02; E05B 77/54
See application file for complete search history.

(56) References Cited

U.S. PATENT DOCUMENTS

| | | |
|---|---|---|
| 6,260,916 B1 | 7/2001 | Hunt |
| 6,411,054 B1 | 6/2002 | Van Wiemeersch |

(Continued)

FOREIGN PATENT DOCUMENTS

| | | | |
|---|---|---|---|
| AT | 5897 U1 * | 1/2003 | ............ B60R 5/041 |
| CA | 2578292 C * | 8/2010 | |

(Continued)

OTHER PUBLICATIONS

English translation of Description of FR2783760A1 (Year: 2000).*

(Continued)

*Primary Examiner* — Lori Lyjak

(57) ABSTRACT

An aspect of the present disclosure is directed to a vehicle comprising a vehicle body comprising a rear bumper; and a rear end module coupled to the rear of the vehicle body, the rear end module comprising: a rear window, and a rear gate, wherein the rear window is configured to move from a closed position to an open position within a cavity of the rear gate, and the rear gate is configured to move from a closed position to an opening position within a cavity formed by the rear bumper.

18 Claims, 9 Drawing Sheets

(56) References Cited

U.S. PATENT DOCUMENTS 6,513,863 B1 * 2/2003 Renke .................... B60P 3/423 296/57.1
6,547,298 B2 4/2003 Sotiroff et al.
6,644,707 B2 11/2003 Mclaughlin et al.
6,837,529 B2 1/2005 Kharod et al.
6,851,741 B1 2/2005 Burg
7,566,094 B2 7/2009 Polewarczyk et al.
10,087,672 B2 * 10/2018 Kalhous ................. E05F 15/76
10,350,972 B2 7/2019 Azzouz et al.
10,507,769 B1 12/2019 Glickman et al.
10,633,033 B1 4/2020 Salter et al.
11,951,854 B2 4/2024 Salter et al.
11,999,274 B2 6/2024 Grant
12,195,101 B2 1/2025 De Salvi et al.
12,269,389 B2 4/2025 Azzouz
2006/0097021 A1 5/2006 Stanton
2006/0197357 A1 9/2006 Catania
2016/0325712 A1 11/2016 Goto
2017/0044816 A1 2/2017 Salter et al.
2017/0096103 A1 4/2017 Clamont
2020/0001793 A1 1/2020 Lynch et al.
2020/0039359 A1 2/2020 Salter et al.
2020/0108658 A1 4/2020 Catalano
2020/0108688 A1 4/2020 Gruber
2020/0130586 A1 4/2020 Colleen et al.
2020/0130751 A1 4/2020 Salter et al.
2020/0139894 A1 5/2020 Glickman et al.
2021/0053498 A1 2/2021 Howard et al.
2022/0056749 A1 2/2022 An
2022/0289113 A1 9/2022 Salter et al.
2022/0348143 A1 11/2022 Weber
2022/0355738 A1 11/2022 Gill et al.
2022/0363328 A1 11/2022 Xin et al.
2023/0278501 A1 9/2023 Gill et al.
2023/0356688 A1 11/2023 Sardelli et al.
2023/0391159 A1 12/2023 Harmon et al.
2023/0391269 A1 12/2023 Harmon et al.
2023/0391270 A1 12/2023 Harmon et al.
2023/0391272 A1 12/2023 Harmon et al.
2023/0398938 A1 12/2023 Koch et al.
2024/0010131 A1 1/2024 Fisker et al.
2024/0059223 A1 2/2024 Harmon et al.
2024/0092137 A1 3/2024 Koberstein et al.
2025/0115189 A1 4/2025 Maeda
2025/0135839 A1 5/2025 Doroudian et al.
2025/0136002 A1 5/2025 Reed et al.

FOREIGN PATENT DOCUMENTS

EP 0774370 A2 * 5/1997 ................ B60J 5/12
EP 0989009 A1 3/2000
FR 2783760 B1 * 11/2004
FR 2953463 A1 6/2011
TW M500706 U 5/2015
WO WO-2008059148 A2 * 5/2008 ............ B60J 1/1861

OTHER PUBLICATIONS

International Search Report & Written Opinion for PCT Application No. PCT/US22/21666 mailed Jul. 12, 2022, Authorized Officer: Kari Rodriquez, 12 pages.

* cited by examiner 502
503
501

VEHICLE HAVING RETRACTABLE REAR GATE

RELATED APPLICATIONS

This application is a continuation in part of PCT International Patent Application Serial No. PCT/US2022/021666, entitled "FRONT STORAGE AND REAR WINDOW GATE RETRACTION FEATURES," filed Mar. 24, 2022, which claims priority to U.S. Provisional Patent Application Ser. No. 63/165,546, entitled "AUTOMOBILE DESIGN HAVING FRONT STORAGE AND REAR WINDOW GATE RETRACTION FEATURES," filed Mar. 24, 2021, which are both hereby incorporated by reference in their entirety. This application is also related to and claims priority to U.S. Provisional Patent Application Ser. No. 63/450,735, entitled "VEHICLE HAVING FRONT STORAGE AND RETRACTABLE REAR GATE," filed Mar. 8, 2023, and which is hereby incorporated by reference in its entirety.

TECHNICAL FIELD

The present disclosure relates to the field of vehicle gates and storage, and more specifically, for a vehicle having a front storage and a retractable rear gate, and the method of manufacturing the same.

BACKGROUND

Vehicles currently require a large space above and behind the vehicle in order to open a rear gate by swinging it up and away from the vehicle. When parking on the street or in parking lots, users may be unable to open the rear gate because of proximity to surrounding vehicles. When parking in small parking lots and residential garages, users may be unable to open the rear gate because the gate would hit the ceiling. There is a need for a vehicle that provides users with the ability to access the rear cargo space of a vehicle in circumstances where space is limited.

Vehicles currently provide limited access to storage in the front portion of the vehicle. Manufacturers restrict access to the under-hood space in electric vehicles to protect the high voltage components. As users are unable to lift the hood of the vehicle, they are unable to access space that may be otherwise available for storage. There is a need for a vehicle that provides storage in the front of the vehicle that is accessible to a user without exposing the user to the high voltage components.

SUMMARY

One aspect of the present disclosure is directed to a vehicle comprising a vehicle body comprising a rear bumper; and a rear end module coupled to the rear of the vehicle body, the rear end module comprising: a rear window, and a rear gate, wherein the rear window is configured to move from a closed position to an open position within a cavity of the rear gate, and the rear gate is configured to move from a closed position to an opening position within a cavity formed by the rear bumper.

Another aspect of the present disclosure is directed to a method of manufacturing a vehicle, comprising assembling a rear end module on an assembly fixture, the rear end module comprising a rear end frame, rear window, and rear gate; and affixing the assembled rear end module to a body of the vehicle.

Another aspect of the present disclosure is directed to a vehicle comprising a vehicle body; and a front storage module coupled to the front of the vehicle body, the front storage module comprising: a drawer; and a drawer actuator configured to move the drawer from a closed position within a cavity of the vehicle body to an open position at least partially extended from the front of the vehicle body.

These and other objects, features and advantages of the present invention will become more apparent from the following description when taken in connection with the accompanying drawings.

DETAILED DESCRIPTION

Figure 1A:
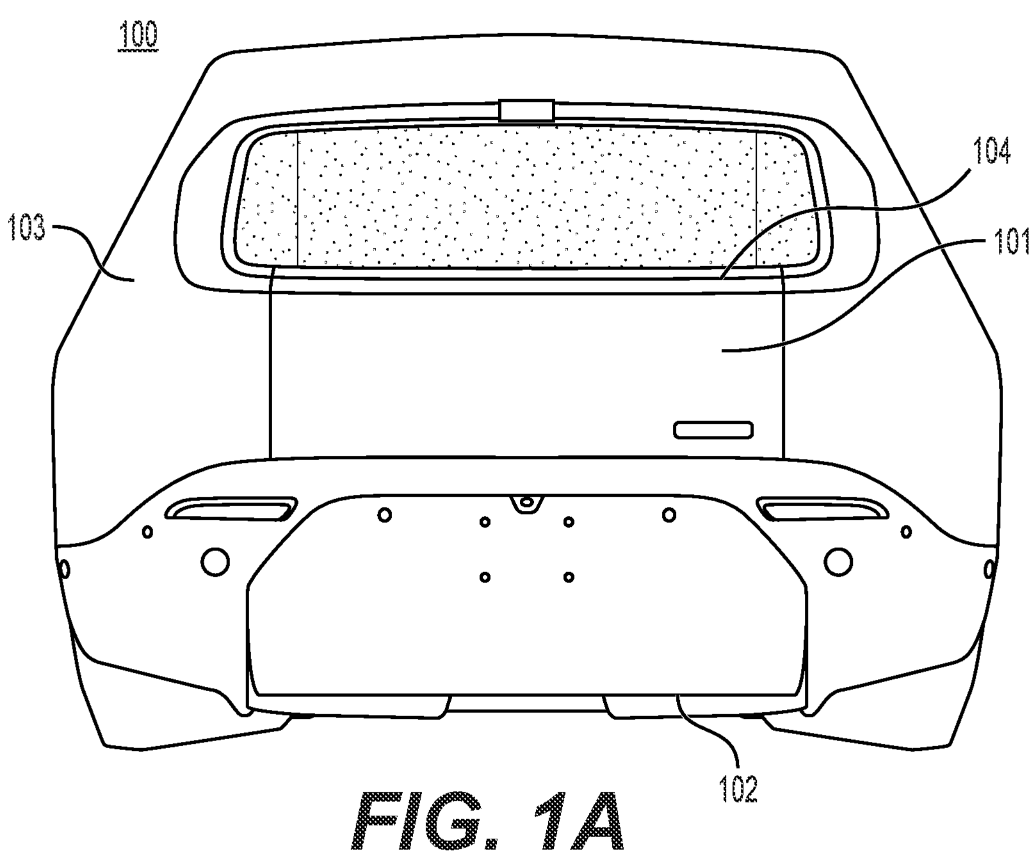
FIGS. 1A-1C are illustrations of an exemplary embodiment of a vehicle with a retractable rear gate.
Figure 1B:
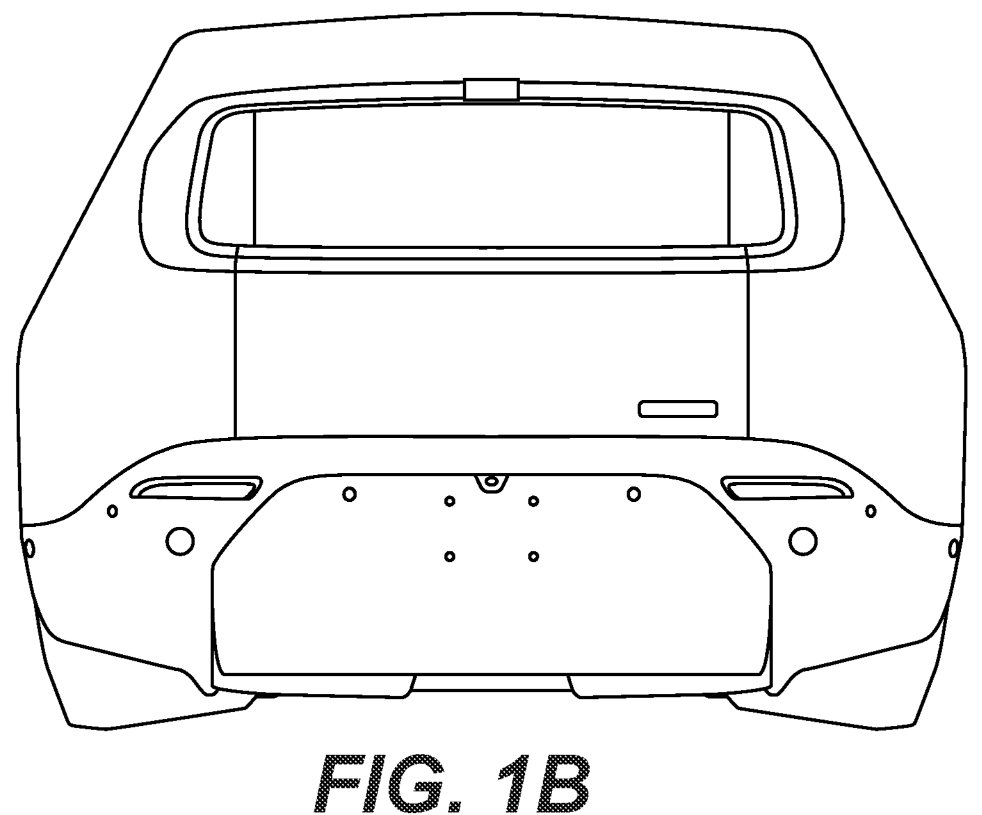
Figure 1C:
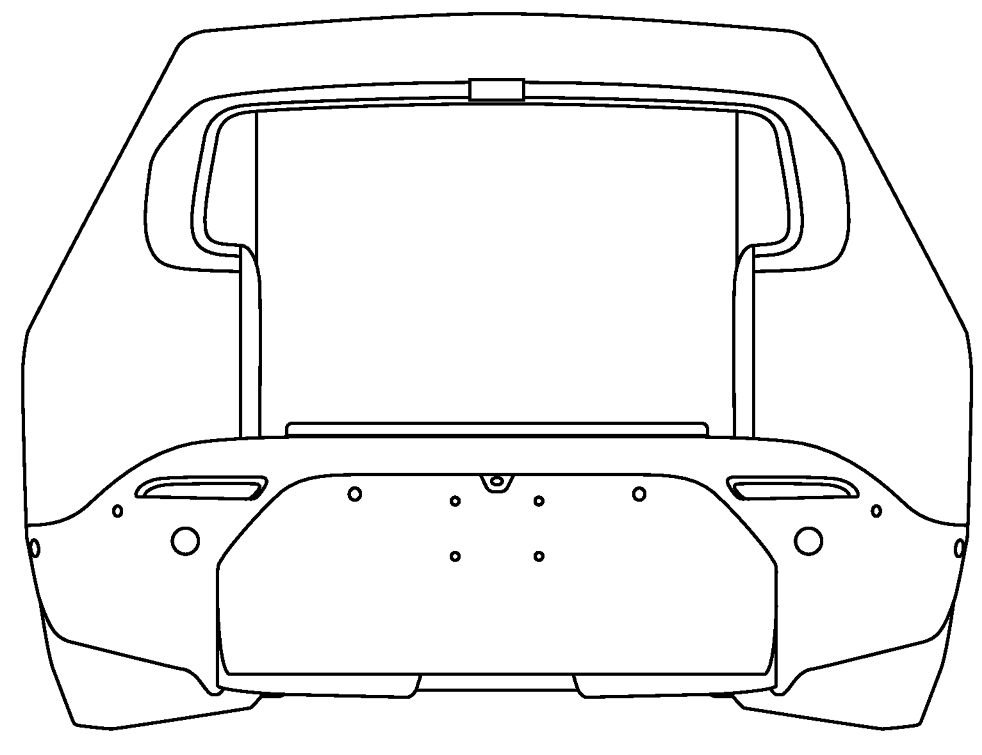
Figure 2A:
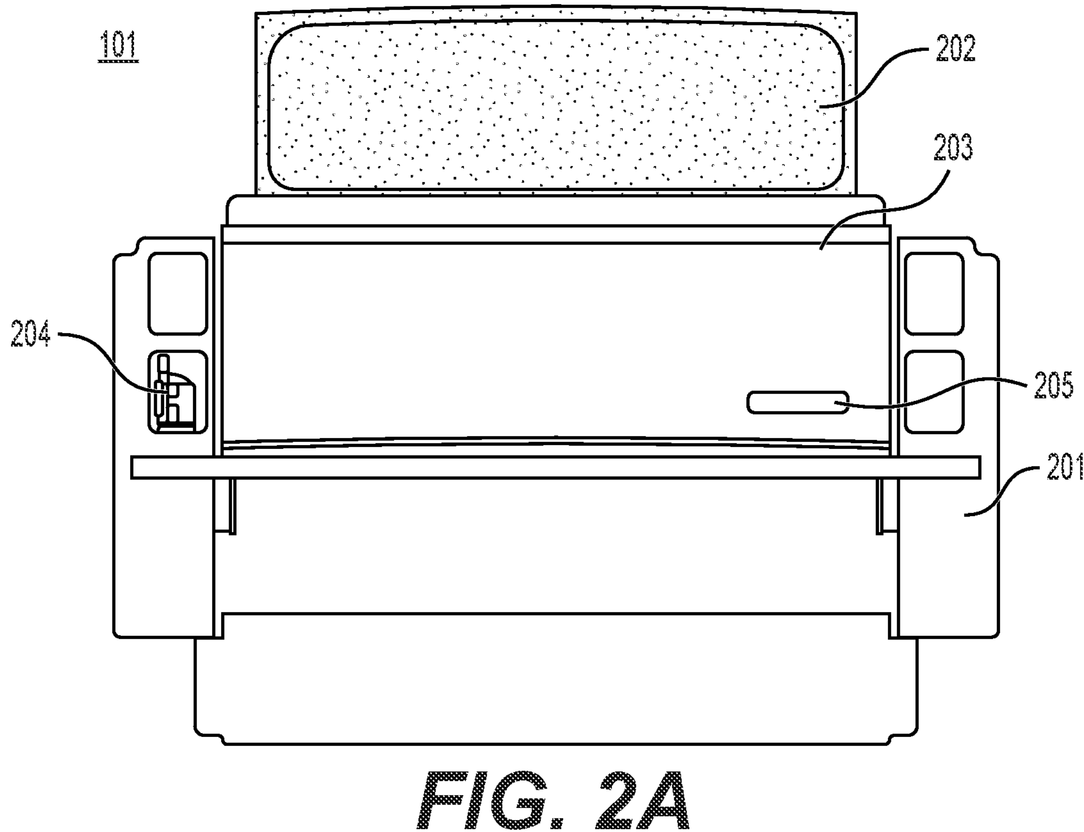
FIGS. 2A-2C are illustrations of an exemplary embodiment of a retractable rear gate.
Figure 2B:
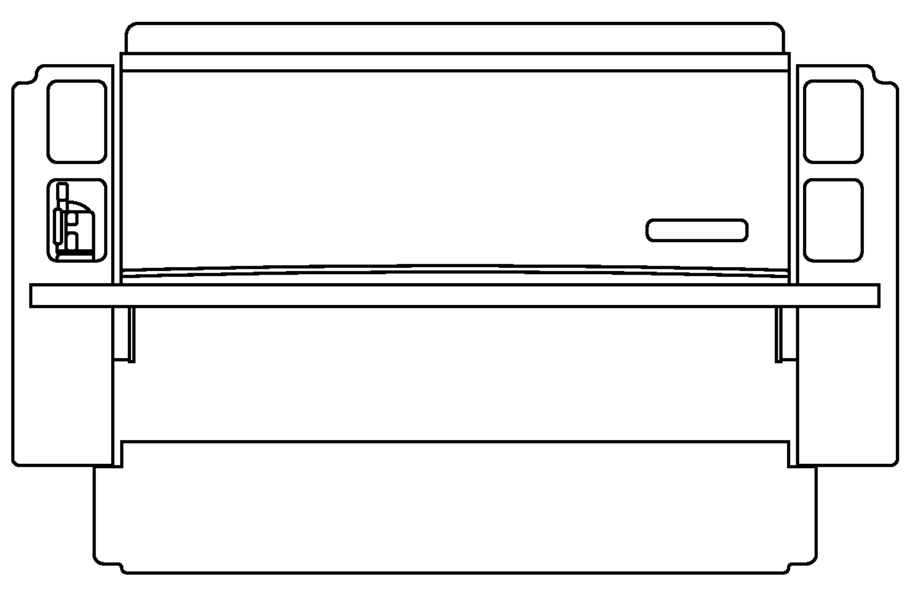
Figure 2C:
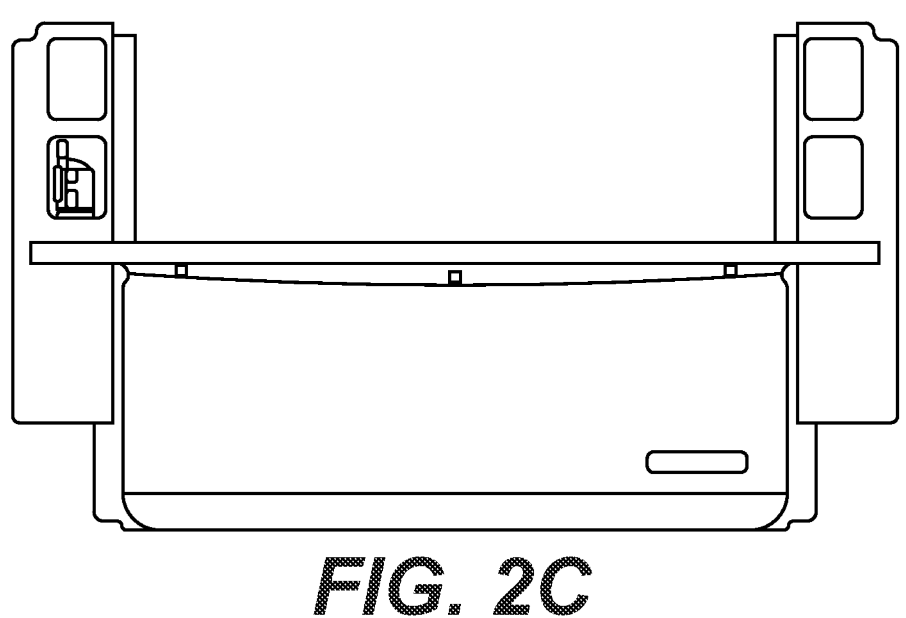
Figure 5:
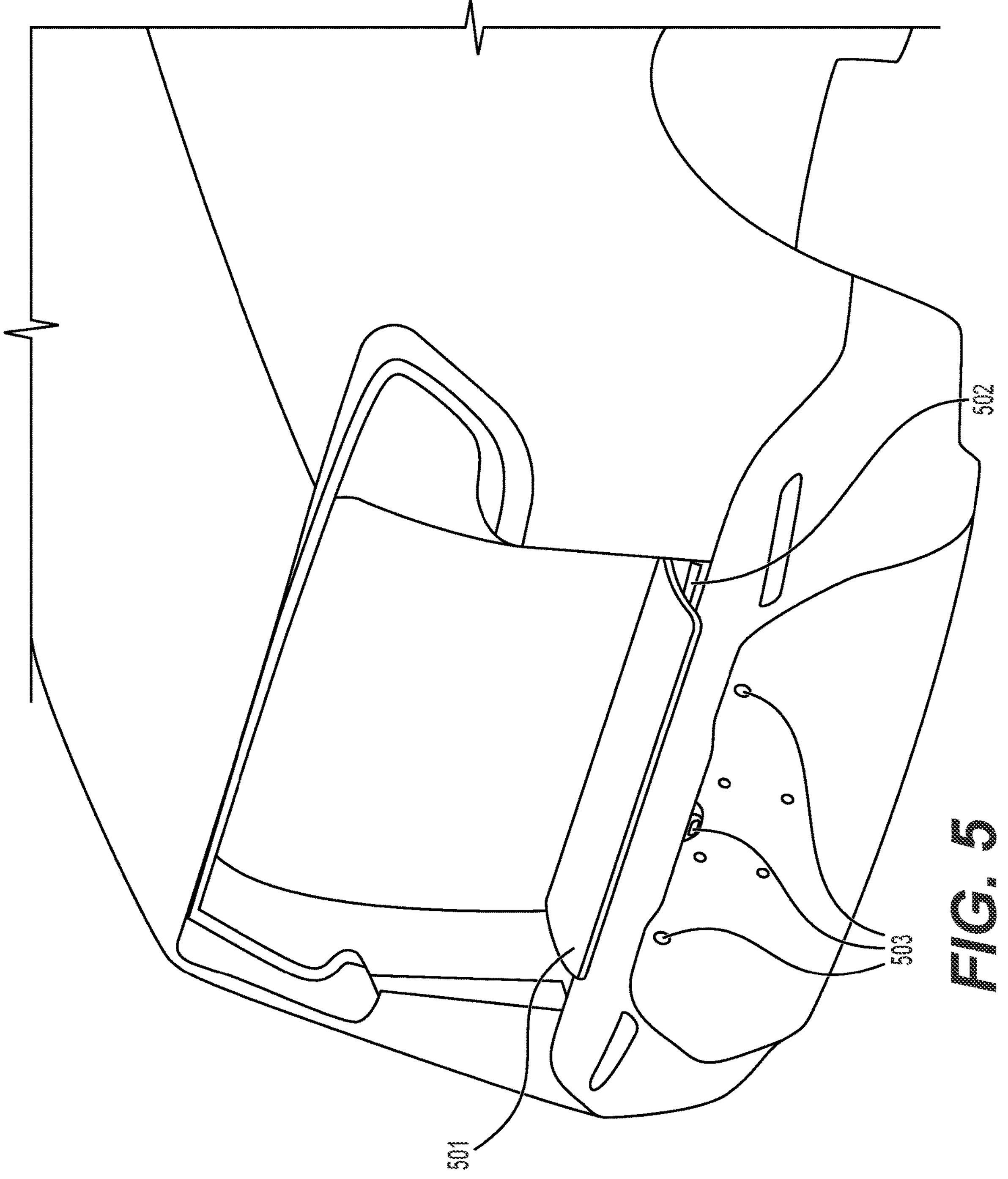
FIG. 5 is an illustration of an exemplary embodiment of a retractable rear gate.

Vehicle FIGS. 1-2 and 5 are exemplary illustrations of a rear view of the vehicle 100. In an embodiment, the vehicle includes a rear end module 101 and a rear bumper 102 attached to the vehicle body 103. The rear end module 101 includes a rear end frame 201, a rear window 202, and a rear gate 203. The rear window 202 is configured to move from a closed position where the rear window 202 is raised, as illustrated in FIGS. 1A and 2A, to an open position where the rear window 202 is retracted within a cavity in the rear gate 203, as illustrated in FIGS. 1B and 2B. The rear gate 203 is configured to move from a closed position where the rear gate is raised, as illustrated in FIGS. 1A-1B and 2A-2B, to an open position where the rear gate 203 is lowered along the rear end frame 201 into a retracted position inside of a cavity of the rear bumper 102, as illustrated in FIGS. 1C and 2C. The rear bumper cavity may be formed entirely within the rear bumper 102 or may be formed by the rear bumper 102 and the vehicle body 103. The rear gate 203 may be positioned behind a rear impact bar of the rear bumper 102 when retracted within the cavity in the rear bumper 102.

Figures 3A, 3B, 4:
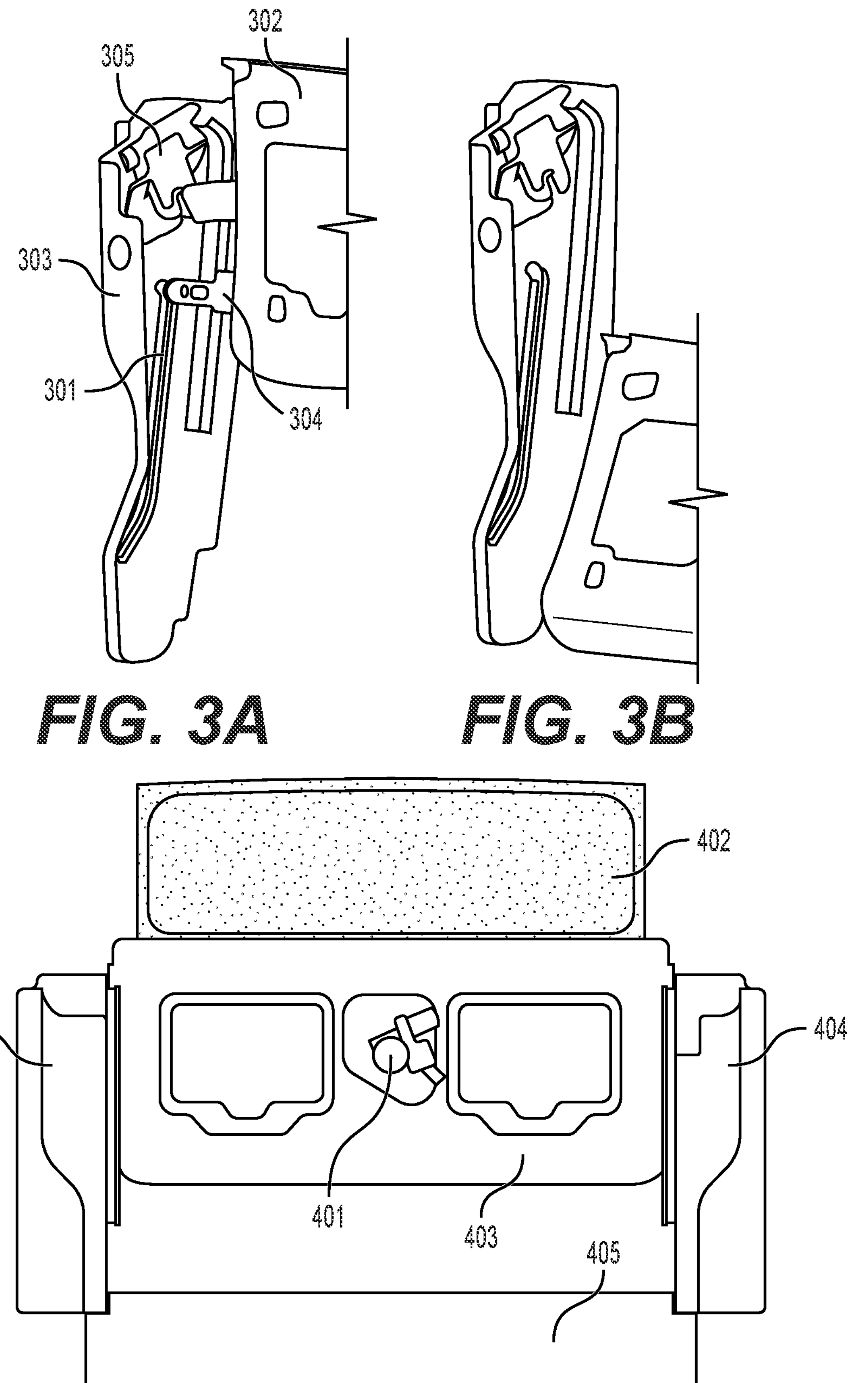
FIGS. 3A-3B are illustrations of an exemplary embodiment of a retractable rear gate.
FIG. 4 is an illustration of an exemplary embodiment of a retractable rear gate.

In some embodiments as illustrated in FIGS. 3A and 3B, the rear end module 101 may further include one or more rear gate actuators 204 and one or more rear gate rails 301. The rear gate 302 is lowered along the rear gate rail by the rear gate actuator, as illustrated in FIGS. 3A-3B. The rear gate may include one or more guides 304 such as a roller or wheels that move along the rear gate rail 301. The rear gate rail 301 may be configured to move the rear gate away from the rear end frame 303 before or as the rear gate 302 is lowered. Moving the rear gate 302 away from the rear end frame allows the gate to separate from seals that may be positioned between the rear gate 302 and the rear end frame 303. The rear gate actuator 204 may include one or more linear or rotary actuators, for example a motor. The motor may directly or indirectly drive the rear gate. The actuator may further include one or more cables, belts, chains, or spindles connecting the rear gate. In some embodiments, the rear gate may be manually actuated between the open and closed position by a user. The rear gate may include a handle which the user uses to manually actuate the rear gate.

In some embodiments, the rear end module may further include one or more rear window actuators 401, as illustrated in FIG. 4. The rear window 402 is configured to be lowered inside of the rear gate 403 by the rear window actuator. The rear window actuator 401 may include one or more linear or rotary actuators, for example as a motor. The rear window actuator 401 may further include a rear window regulator driven by the linear or rotary actuator.

Figure 9:
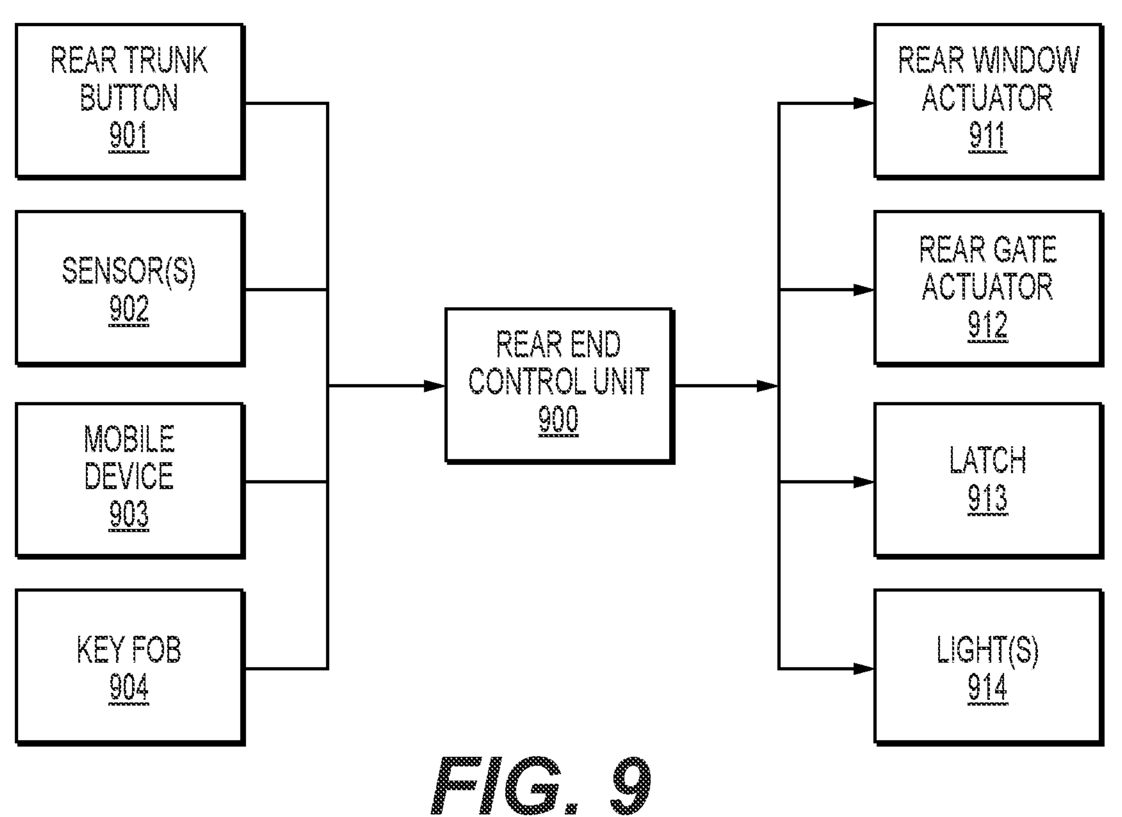
FIG. 9 is an illustration of an exemplary embodiment of a rear end control unit.

In some embodiments as illustrated in FIG. 9, the vehicle includes a control unit 900 programmed to control the functions of the rear end module. The control unit may be a standalone control unit for the rear end module, a control unit that controls the function of multiple vehicle components, or a module or virtualization in another control unit of the vehicle. The control unit may include a processor, random access memory (RAM), storage, and input and output ports. The processor may be one or more microprocessors. The RAM functions as a work memory that temporarily stores data to be processed by processor. The storage is capable of saving information that has been put therein. The storage may include a read only memory (ROM) and a rewritable non-volatile memory. As the processor executes a program stored in storage, various types of control are carried out. Other vehicle control units include the same hardware configuration as the control unit 900.

In some embodiments, the rear end control unit 900 may send a signal to the rear window actuator 401/911 to raise and lower the rear window 402, as illustrated in FIG. 4. The rear end control unit 900 may send a signal to the rear gate actuator 403/912 to raise and lower the rear gate 404. The rear end control unit 900 may send signals to the rear window actuator 401 and rear gate actuator 403 to open and close the rear window 402 and rear gate 404 in sequence or simultaneously. The rear end control unit 900 may prohibit the rear gate 404 from being opened when the rear window 402 is in the closed position. The rear end control unit 900 may prohibit the rear window 402 from being closed when the rear gate 404 is in the open position.

In some embodiments, the rear end control unit 900 may receive a signal to open or close the rear window and rear gate from one or more rear end buttons 205/901, as illustrated in FIG. 2A. The rear end button 205 may be a physical button, a touch sensitive button, or a selection in a graphical user interface on the center console, mobile device, or other display. The rear end button 205 may be located on the rear gate 203, the rear end frame 201, the rear bumper 102 and/or elsewhere in the vehicle exterior or interior. Locating the rear end button 205 at a low location, such as on the rear gate or rear bumper, improves accessibility as compared to a conventional liftgate where the button may be difficult to access when the liftgate is in a raised position. In some embodiments, the rear end control unit 900 may receive the signal to open or close the rear window and rear gate from a motion sensor 503/902. The motion sensor 503 may be an ultrasonic, infrared, optical, camera, LIDAR, or RADAR sensor. The motion sensor 503 may be located on or under the rear bumper 102, as illustrated in FIG. 5. The motion sensor may be located on the rear gate 203 or on the vehicle body 103. The motion sensor may be responsive to a motion from a user, for example a waving or kicking motion. The rear end control unit 900 may also receive the signal to open or close the rear window and rear gate from another vehicle control unit. The rear end control unit may also receive the signal to open or close the rear window and rear gate wirelessly from a mobile device 903 or key fob 904.

In some embodiments, the rear end module includes one or more latches 305/913 configured to hold the rear gate in the opened and/or closed position, as illustrated in FIG. 3A. The latch may be located on the rear gate rail 301, or rear gate 302. The latch may be actuated by the rear end control unit 900 or another vehicle control unit. The latch may be automatically actuated by the motion of the rear gate 302. The latch may be automatically actuated in response to a vehicle event, for example a collision.

In some embodiments, the vehicle further includes a closure flap 501, as illustrated in FIG. 5. The closure flap 501 is moved into position over the opening of the rear bumper cavity 502 when the rear gate has retracted. The closure flap 501 may be actuated passively by the movement of the rear gate. The closure flap may further be moved by a closure actuator, such as a motor. In embodiments where the closure flap is moved by the closure actuator, the closure actuator may be controlled by the rear end control unit. The closure flap prevents debris and water from entering the cavity of the rear bumper when the rear gate is in the open position.

In some embodiments, the rear end module includes one or more lights 104/914, as illustrated in FIG. 1A. The light may be positioned on the rear gate. The light may include a single light, such as an LED, an array of lights, or a display, such as an LCD. The lights may be actuated by the rear end control unit 900 or another vehicle control unit.

In another embodiment, the rear end module is manufactured separate from the rest of the vehicle body. Assembling the rear end module may include the step of mounting the rear end frame to an assembly fixture (not pictured). The rear end frame may comprise two or more pillars 404 and one or more crossmembers 405 which are affixed while mounted to the assembly fixture. The assembling may further include mounting the rear gate carrier to the rear end frame. The assembling may further include mounting the rear gate to the rear gate carrier. The rear window and rear window actuators may be mounted inside the rear gate before or after the rear gate is mounted rear end module on the assembly fixture. The assembly fixture carrying the rear end module may be moved to the vehicle body and the assembled rear end module may be mounted to the vehicle body. The vehicle body may be a unibody design or a body on frame design. The rear end frame may include mounting points for affixing the rear end module to the rear D-Ring. Manufacturing the rear end module separately reduces costs and improves the efficiency of the manufacturing process. Repair and serviceability are improved by the rear end module being replaceable as a complete assembly.

Figures 6A, 6B:
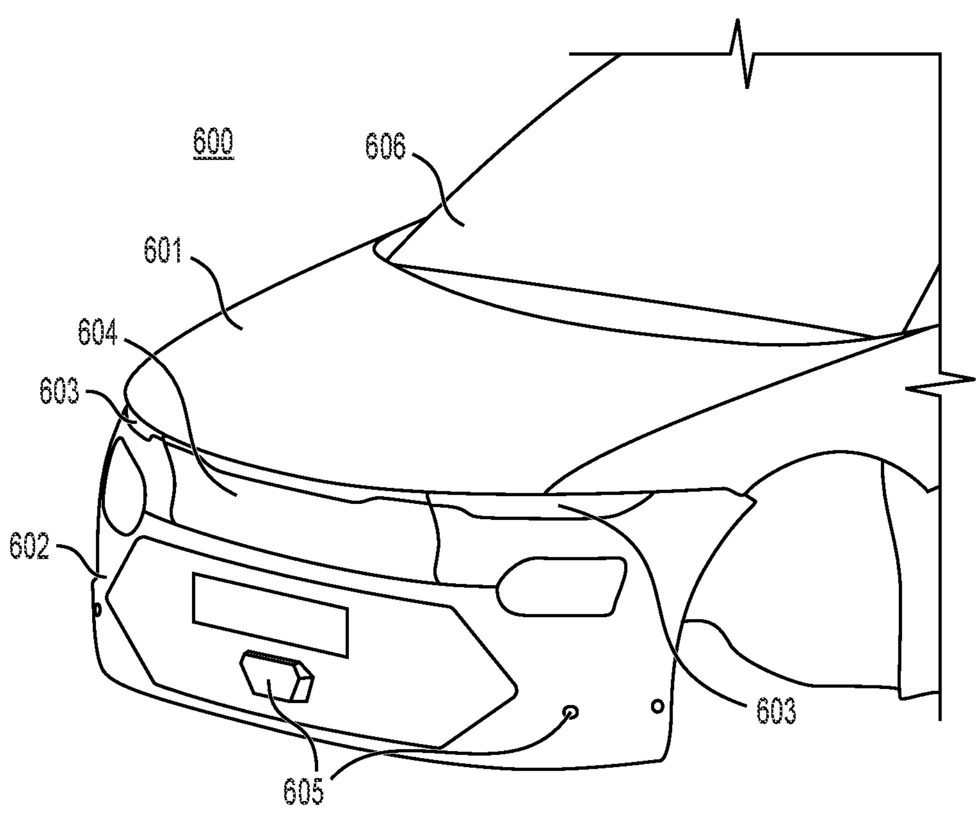
FIGS. 6A-6B are illustrations of an exemplary embodiment of a vehicle with a front storage module.

FIGS. 6A-6B are exemplary illustrations of a front view of the vehicle 600. In an embodiment, the vehicle includes a hood 601, a front bumper 602, headlights 603, and a front storage module 604. The front storage module 604 may be located between the headlights 603 and above the front bumper 602. As illustrated in FIG. 6B, the front storage module 604 includes a drawer 607 which is an open box with sides and a bottom base. The drawer 605 is configured to move from a closed position where the drawer is retracted within a cavity in the vehicle, as illustrated in FIG. 6A, to an open position where the drawer extends at least partially out of the vehicle, as illustrated in FIG. 6B.

Figure 8A:
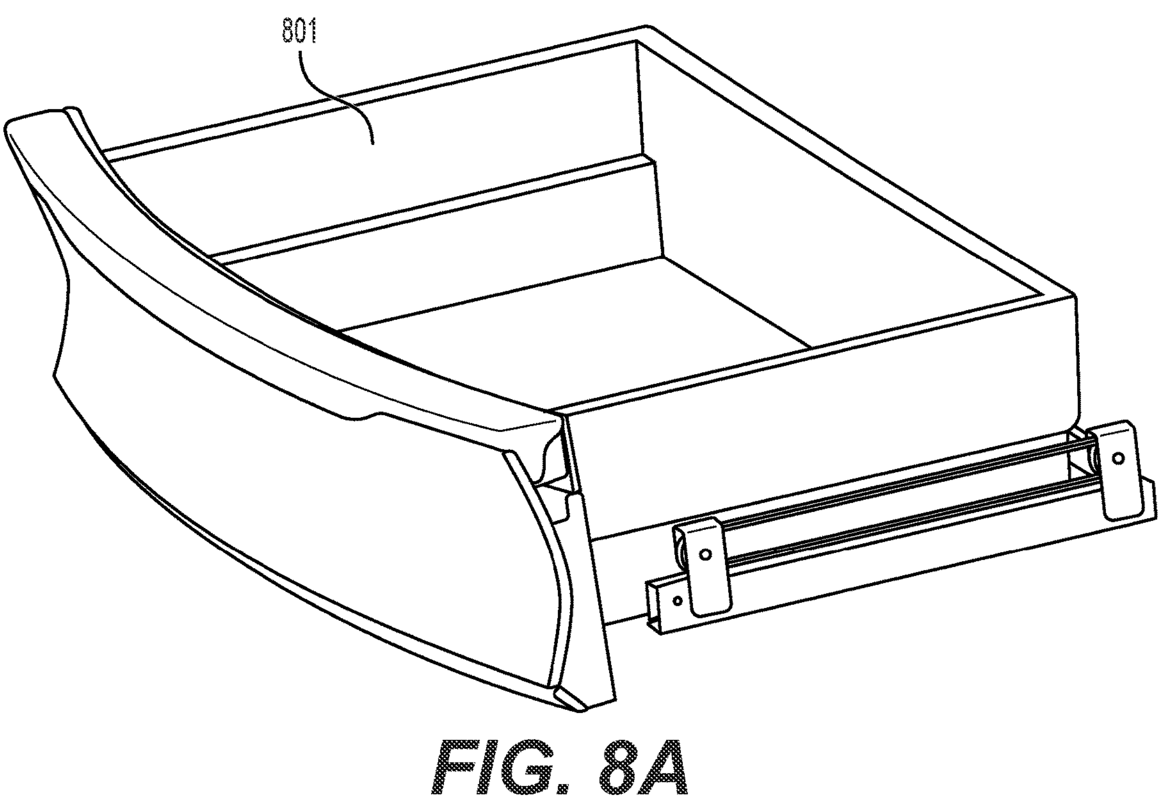
FIGS. 8A-8B are illustrations of an exemplary embodiment of a front storage module.
Figure 8B:
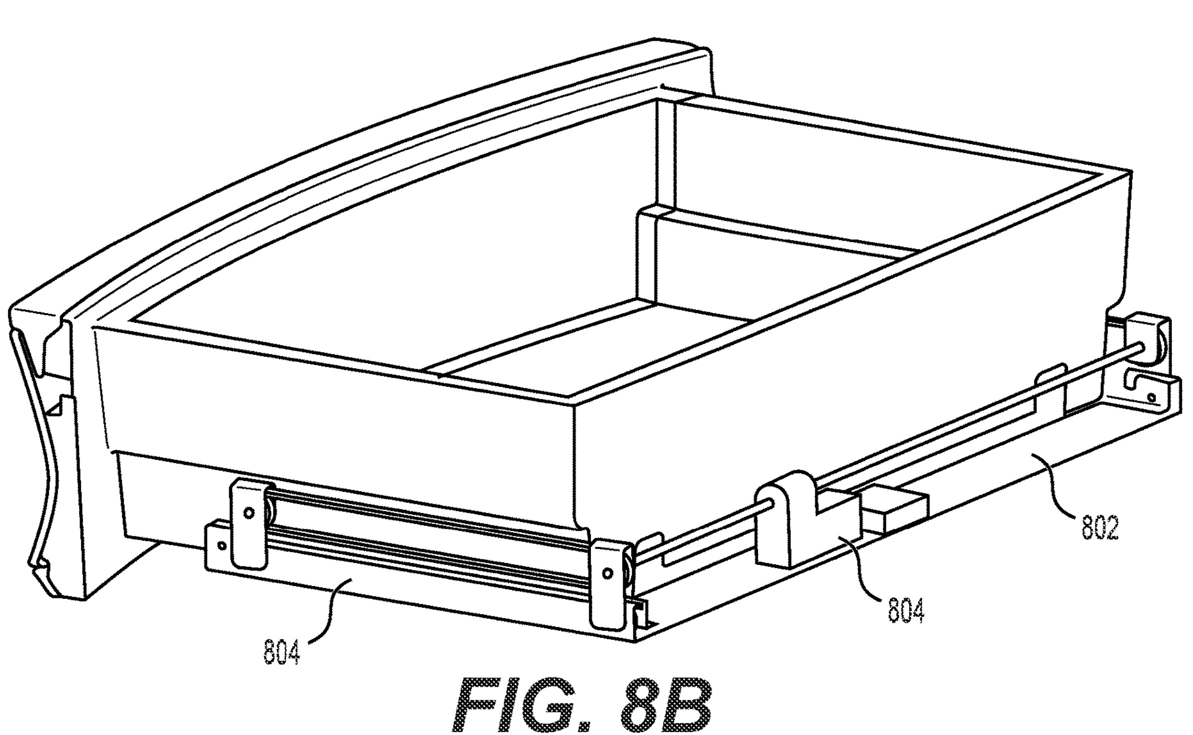

In some embodiments as illustrated in FIG. 8A-8B, the front storage module 604 may further include one or more drawer carrier 802. The drawer 801 carrier may include one or more drawer rail 803 and one or more drawer actuator 804. The drawer 801 is configured to be extended along the drawer rail by the drawer actuator. In some embodiments the carrier may include a crossmember that the drawer is attached to. In another embodiment the drawer may include one or more guides such as a roller or wheels that move along the drawer carrier. The front storage module may further include a guide box 701 in which the drawer and drawer carrier are situated. The drawer actuator 804 may include one or more a linear or rotary actuators, for example a motor. The motor may directly or indirectly drive the drawer. The drawer actuator may further include one or more cables, belts, chains, spindles, and/or springs. In some embodiments, the drawer may be manually actuated between the open and closed position by a user. The drawer may include a handle which the user uses to manually open and close the drawer. The drawer actuator may partially open and close the drawer or assist the manual opening and closing of the drawer.

In some embodiments, the drawer may be configured to move vertically up or down once it has at least partially extended out of the vehicle body. The drawer may be moved vertically by the shape of the rail, by the rail pivoting, and/or the rail extending out of the vehicle. The drawer carrier may include an additional actuator that allows the drawer to move vertically.

Figure 7A:
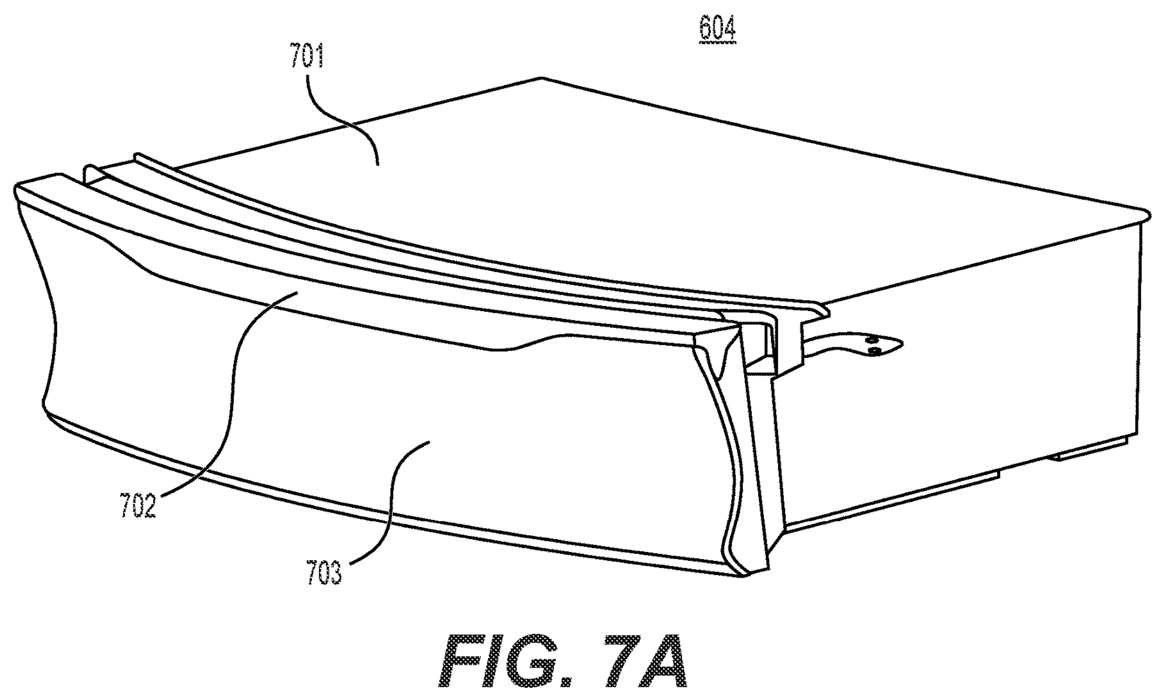
FIGS. 7A-7B are illustrations of an exemplary embodiment of a front storage module.
Figure 7B:
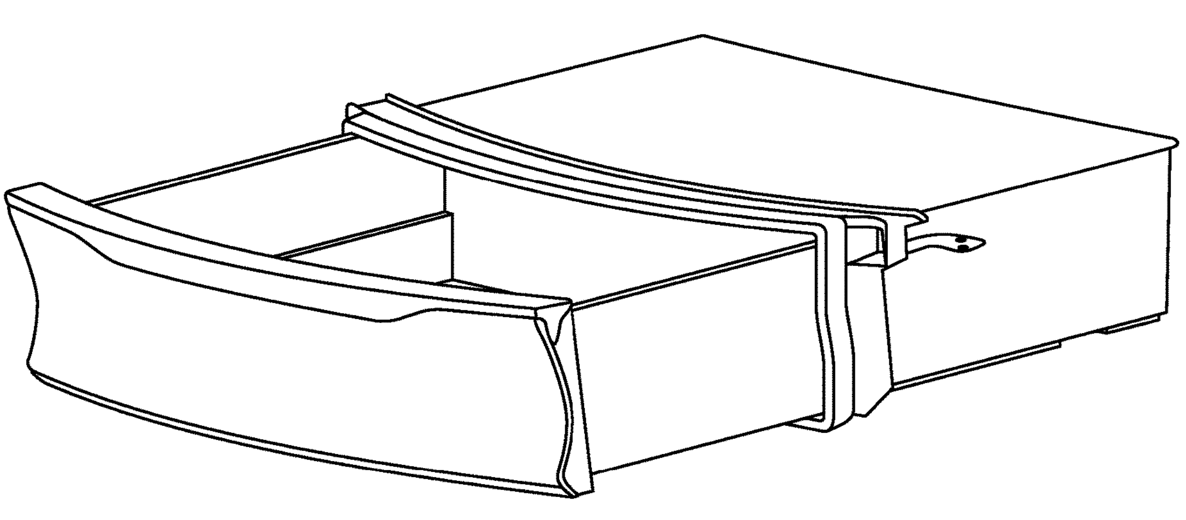

In some embodiments, the front storage module further includes a front panel 703, as illustrated in FIGS. 7A-7B. The front panel 703 may be fixed to a side of the drawer or moveable coupled to the drawer or other part of the vehicle body. The front panel may be configured to pivot to the side or downwards passively based on the movement of the front drawer. The front panel may be moved by a front panel actuator (not shown), such as a motor. The front panel may be configured to retract into the front bumper using components similar to the rear end module.

Figure 10:
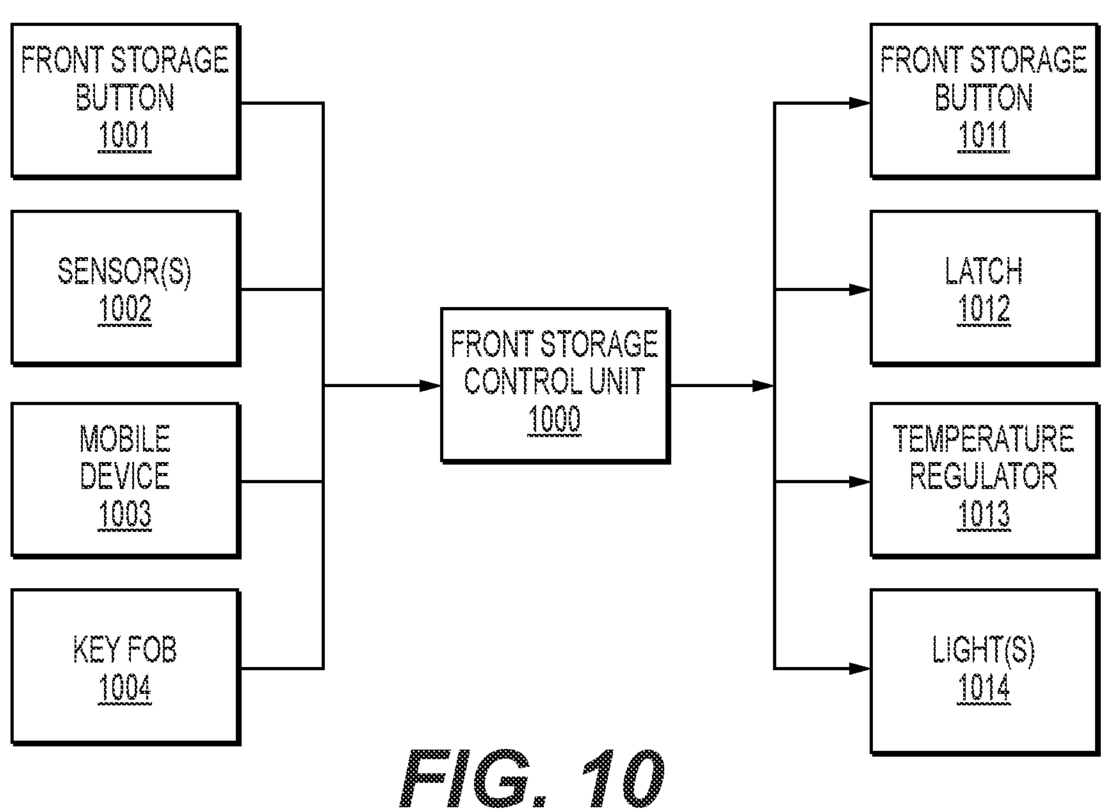
FIG. 10 is an illustration of an exemplary embodiment of a front storage control unit.

In some embodiments as illustrated in FIG. 10, the vehicle includes a control unit 1000 programmed to control the functions of the front storage module 604. The control unit may be a standalone control unit for the front storage module, a control unit that controls the function of multiple vehicle components, or a module or virtualization in another control unit of the vehicle. The control unit may include a processor, random access memory (RAM), storage, and input and output ports. The processor may be one or more microprocessors. The RAM functions as a work memory that temporarily stores data to be processed by processor. The storage is capable of saving information that has been put therein. The storage may include a read only memory (ROM) and a rewritable non-volatile memory. As the processor executes a program stored in storage, various types of control are carried out. Other vehicle control units include the same hardware configuration as control unit 1000.

In some embodiments, the front storage control unit 1000 may send a signal to the drawer actuator 804 to extend or retract the drawer 801. The front storage control module 1000 may receive the signal from one or more front storage buttons 1001. The front storage button 1001 may be a physical button, a touch sensitive button, or a selection in a graphical user interface on the center console, mobile device, or other display. The front storage button 1001 may be located on the front storage module 604, the hood 601, the front bumper 602, and/or elsewhere in the vehicle 600 exterior or interior. The front storage control unit 1000 may receive the signal to open or close the front storage from a motion sensor 605/1002. The motion sensor 605 may be an ultrasonic, infrared, optical, camera, LIDAR, or RADAR sensor. The motion sensor 605 may be located on or under the front bumper 602, as illustrated in FIG. 6A. The motion sensor 605 may be located on the front storage module 604 or on the vehicle body 606. The motion sensor 605 may be responsive to a motion from a user, for example a waving or kicking motion. The front storage control unit may also receive the signal to open or close the rear window and rear gate from another vehicle control unit. The front storage control unit 1000 may also receive the signal to open or close the drawer wirelessly from a mobile device 1003 or key fob 1004.

In some embodiments, the vehicle includes additional sensors 605, such as ultrasonic, infrared, optical, camera, LIDAR, and RADAR sensors used in an Advanced Driver Assistance System (ADAS), as illustrated in FIG. 6A. The additional sensors 605 may further include sensor sensing the movement of the vehicle, such as an accelerometer. The front storage control unit 1000 is configured to receive signals from the motion sensors and the additional sensors to prevent the drawer from opening. For example, the front storage control unit 1000 may receive signals indicating that an obstacle is blocking the drawer from extending fully and prevent the drawer from extending to avoid hitting the obstacle. The front storage control unit 1000 may prevent the drawer 607 from extending in the case of a front collision when it is determined that vehicle motion has exceeded a threshold. The front storage control unit 1000 may prevent the drawer from extending when it is determined that the vehicle is in motion. The front storage module 604 may include a latch 1012 which prevents the drawer from opening or closing. The latch 1012 may be a separate component or a feature of the drawer rail 804, such as a detent.

In some embodiments, the drawer includes a temperature regulator 1013 that can heat and/or cool the contents of the drawer. The temperature regulator 1013 may include heating elements such as electric heating elements, a heat exchanger, or a fan. The temperature regulator 1013 may be configured to receive coolant from the vehicle's heat exchanger. The temperature regulator 1013 may receive heated and/or cooled air from the vehicle's heating, ventilation, and air conditioning (HVAC) system. The temperature regulator 1013 may be a separate component from the base which is removeable. The drawer 801 may be thermally insulated. The drawer 801 may have a drain hole and plug capable of allowing the contents of the drawer 801 to be drained. The front storage control unit 1000 may control the heating and cooling of the temperature regulator 1013. The front storage control unit 1000 may limit the heating and cooling of the temperature regulator 1013 based on a state of charge (SOC) of a battery of the vehicle 600.

In some embodiments, the front storage module 604 includes an electrical outlet (not shown). The electrical outlet may be connected to the low or high voltage electrical system of the vehicle. The electrical outlet may be connected to an independent power source, such as an auxiliary battery. The electrical outlet may be connected to a dedicated voltage regulator or to a voltage regulator elsewhere in the vehicle. The outlet may be connected to a power source powered by solar panels located on or connected to the vehicle.

In some embodiments, the front storage module includes one or more light 702/1014, as illustrated in FIG. 7A. The light 702 may be positioned on or around the drawer or front panel. The light may be positioned inside of the drawer. The light 702 may include a single light, such as an LED, an array of lights, or a display, such as an LCD. The light may be actuated by the front storage control unit 1000 or another vehicle control unit. The light may be actuated according to the opened or closed position of the drawer.

In some embodiments, components of the front storage module are removeable from the vehicle. The drawer may be configured to slide off or be otherwise detachable from the drawer rails. Detaching the drawer may require actuating a latch, lever, or button. Removing the drawer allows for the contents to be more easily removed, for the drawer to be cleaned, and for improved serviceability.

In some embodiments, the front storage module, or a storage module with the components of the front storage module, may be positioned at other locations on the vehicle and/or may extend in different directions. For example, the front storage module may extend upwardly out of the hood. In further examples: a storage unit may be located on the roof and extend upwardly; located on the rear and extend rearwardly; or on the side of the vehicle and extend outwardly to the side. Positioning a storage module at the rear of the vehicle allows for space under the cargo area to be more easily accessible.

It will be apparent to those skilled in the art that various modifications and variations can be made to the disclosed vehicle structures. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A vehicle comprising:
a vehicle body comprising a rear bumper; and
a rear end module coupled to the rear of the vehicle body, the rear end module comprising:
a rear window, and
a rear gate,
wherein the rear window is configured to move from a window-closed position to a window-open position within a cavity of the rear gate, and the rear gate is configured to move from a gate-closed position to a gate-open position within a rear bumper cavity formed by the rear bumper.

2. The vehicle of claim 1, wherein the rear end module further comprises:
a rear end frame;
at least one rear gate rail; and
at least one rear gate actuator,
wherein the at least one rear gate actuator is configured to move the rear gate between the gate-closed position and the gate-open position along the at least one rear gate rail.

3. The vehicle of claim 2, wherein the at least one rear gate rail is configured such that, when the rear gate is moved from the gate-closed position to the-gate open position, the rear gate moves horizontally away from the rear end frame as the rear gate moves vertically down into the rear bumper cavity.

4. The vehicle of claim 2, wherein the at least one rear gate actuator comprises:
a motor; and
at least one a cable, belt, chain, or spindle coupled to the motor and the rear gate.

5. The vehicle of claim 2, further comprising a control unit configured to control the at least one rear gate actuator to move the rear gate between the gate-closed position and the gate-open position.

6. The vehicle of claim 5, wherein the control unit is further configured to prevent the rear gate from opening when the rear window is in the window-closed position.

7. The vehicle of claim 5, wherein the control unit is further configured to prevent the rear window from closing when the rear gate is in the gate-open position.

8. The vehicle of claim 1, wherein the rear end module further comprises a latch configured to prevent the rear gate from opening or closing.

9. The vehicle of claim 1, further comprising: a closure flap configured to cover the rear bumper cavity when the rear gate is in the gate-open position.

10. A method for controlling a vehicle, the method comprising:
receiving a signal to open a rear gate of the vehicle; and
in response to the signal:
sending a gate signal to a gate actuator of the rear gate instructing the gate actuator to move the rear gate to a gate-open position within a rear bumper cavity formed by a rear bumper; and
sending a window signal to a window actuator of a rear window instructing the window actuator to move the rear window from a window-closed position to a window-open position within a cavity of the rear gate.

11. The method of claim 10, comprising:
receiving a second signal to close the rear gate; and
in response to the second signal, sending a second gate signal to the gate actuator instructing the gate actuator to move the rear gate to a closed position.

12. The method of claim 11, comprising:
sending a second window signal to the window actuator instructing the window actuator to move to the window-closed position.

13. The method of claim 10, comprising:
sending a flap signal to a closure actuator instructing the closure actuator to close a flap over an opening of the rear bumper cavity when the rear gate is in the rear bumper cavity.

14. The method of claim 10, comprising:
before sending the gate signal, sending a signal to a latch actuator instructing the latch actuator to release a latch holding the rear gate in the gate-open position.

15. The method of claim 10, wherein the gate actuator moves the rear gate simultaneously with the window actuator moving the rear window.

16. The method of claim 10, wherein the gate actuator moves the rear gate in response to the rear window reaching the window-open position.

17. The method of claim 10, wherein the signal is received from a button or a motion sensor.

18. The method of claim 10, wherein the signal is received over a wireless link.

* * * * *